US012620805B2

(12) United States Patent
Zou et al.

(10) Patent No.: US 12,620,805 B2
(45) Date of Patent: May 5, 2026

(54) ELECTRICAL ASSEMBLY

(71) Applicant: GE Infrastructure Technology LLC, Greenville, SC (US)

(72) Inventors: Li Zou, Stafford (GB); Andrzej Adamczyk, Stafford (GB); Carl Barker, Stafford (GB); John Fradley, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 269 days.

(21) Appl. No.: 18/556,946

(22) PCT Filed: Apr. 28, 2022

(86) PCT No.: PCT/EP2022/061337
§ 371 (c)(1),
(2) Date: Oct. 24, 2023

(87) PCT Pub. No.: WO2022/233702
PCT Pub. Date: Nov. 10, 2022

(65) Prior Publication Data
US 2024/0204519 A1 Jun. 20, 2024

(30) Foreign Application Priority Data
May 5, 2021 (EP) ..................................... 21275052

(51) Int. Cl.
*H02J 3/001* (2026.01)
*H02J 3/0012* (2026.01)
(Continued)

(52) U.S. Cl.
CPC ................ *H02J 3/001* (2020.01); *H02J 3/38* (2013.01); *H02J 3/0012* (2020.01); *H02J 3/36* (2013.01); *H02M 1/325* (2021.05); *H02M 7/4835* (2021.05)

(58) Field of Classification Search
CPC .. H02J 3/001; H02J 3/0012; H02J 3/36; H02J 3/38; H02M 1/32; H02M 1/325; H02M 7/4835
See application file for complete search history.

(56) References Cited

U.S. PATENT DOCUMENTS

2019/0260201 A1* 8/2019 Hu ........................... H02J 3/388
2019/0265663 A1* 8/2019 Harnefors ................. H02J 3/34

FOREIGN PATENT DOCUMENTS

EP          2916442 A1      9/2015
GB          2451463 A       2/2009
WO      2019229638 A1     12/2019

OTHER PUBLICATIONS

Extended European Search Report issued in EP Application No. 21275052.5 dated Oct. 1, 2021 , 8 pages.
(Continued)

*Primary Examiner* — Fred E Finch, III
(74) *Attorney, Agent, or Firm* — Eversheds Sutherland (US) LLP

(57) ABSTRACT

An electrical assembly including a voltage sourced converter for connection to an AC network, a controller programmed so that, responsive to detection of a fault in the AC network, the controller obtains a first set of voltage and current measurements taken at an interface connection point, change operation of the voltage sourced converter to inject a modified fault current, and then obtain a second set of voltage and current measurements, determine operating parameters of the voltage sourced converter for injecting a target fault current having a target phase angle that is
(Continued)

substantially the same as a phase angle of a reference fault current that would have resulted from operation of the voltage sourced converter in accordance with pre-fault steady-state voltage phase and magnitude values, and operate the voltage sourced converter in accordance with the determined operating parameters so as to inject the target fault current at the target phase angle.

12 Claims, 5 Drawing Sheets

(51) Int. Cl.
| | | |
|---|---|---|
| *H02J 3/38* | (2026.01) | |
| *H02M 7/483* | (2007.01) | |
| *H02J 3/36* | (2026.01) | |
| *H02M 1/32* | (2007.01) | |

(56) References Cited

OTHER PUBLICATIONS

International Search Report and Written Opinion for PCT/EP2021/058522, dated Jun. 5, 2021, 11 pages.

Rajaei, et al., "Fault Current Management Using Inverter-Based Distributed Generators in Smart Grids," in IEEE Transactions on Smart Grid, vol. 5, No. 5, pp. 2183-2193, Sep. 2014, doi: 10.1109/TSG.2014.2327167.

Kapoor, et al., "Fault Current Control Using a Repetitive Controller Based DVR," 2015 Second International Conference on Advances in Computing and Communication Engineering, Dehradun, India, 2015, pp. 224-227, doi: 10.1109/ICACCE.2015.73.

International Search Report and Written Opinion issued in International Application No. PCT/US2024/018109 dated Jun. 18, 2024, 15 pages.

Sun-Li Yu et al. Removal of decaying DC in current and voltage signals using a modified Fourier filter algorithm. IEEE Transactions on Power Delivery, vol. 16, No. 3, pp. 372-379, Jul. 2001, doi: 10.1109/61.924813.

Surwase et al. Comparative evaluation of phasor estimation for fault location in double end transmission system. 2015 Annual IEEE India Conference (INDICON), New Delhi, India, 2015, pp. 1-6, doi: 10.1109/INDICON.2015.7443640.

Salehi-Dobakhshari et al. Robust fault location of transmission lines by synchronised and unsynchronised wide-area current measurements. let Generation Transmission & Distribution 8 (2014): 1561-1571.

* cited by examiner

ELECTRICAL ASSEMBLY

TECHNICAL FIELD

This invention relates to an electrical assembly, preferably for use in high voltage direct current (HVDC) power transmission networks.

BACKGROUND OF THE INVENTION

In HVDC power transmission networks alternating current (AC) power is typically converted to direct current (DC) power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised in power transmission networks where it is necessary to interconnect the DC and AC networks. In any such power transmission network, converters are required at each interface between AC and DC power to effect the required conversion from AC to DC or from DC to AC.

SUMMARY OF THE INVENTION

According to a first aspect of the invention, there is provided an electrical assembly comprising:
 a voltage sourced converter for connection to an AC network;
 a controller programmed so that, responsive to detection of a fault in the AC network, the controller:
  obtains a first set of voltage and current measurements taken at an interface connection point between the voltage sourced converter and the AC network;
  after obtaining the first set of voltage and current measurements, change operation of the voltage sourced converter to inject a modified fault current, and then obtain a second set of voltage and current measurements taken at the interface connection point;
  using the first and second sets of voltage and current measurements, determine operating parameters of the voltage sourced converter for injecting a target fault current having a target phase angle that is the same, or substantially the same, as a phase angle of a reference fault current that would have resulted from operation of the voltage sourced converter in accordance with pre-fault steady-state voltage phase and magnitude values; and
 operate the voltage sourced converter in accordance with the determined operating parameters so as to inject the target fault current at the target phase angle.

The configuration of the controller of the invention provides the electrical assembly with a fault current phase control capability that enables operation of the voltage sourced converter to inject a target fault current in phase with the reference fault current. In contrast, in the absence of the fault current phase control capability, a phase angle of the fault current would be uncontrolled and thereby arbitrary when a magnitude of an output voltage of the voltage sourced converter is reduced to lower the fault current, for example, to be equal to or below a rated current limit of the voltage sourced converter.

The ability to control the phase angle of the fault current in accordance with the invention provides reliable information about the state of the faulted AC network that is beneficial for a wide range of AC network applications, such as current differential protection and phase comparison protection. Moreover the fault current phase control capability is straightforward to integrate into existing control architecture for power transmission networks and voltage sourced converters.

The voltage sourced converter may be an AC/DC, DC/AC or AC/AC voltage sourced converter.

The interface connection point may be, but is not limited to, a point of common coupling, a grid entry point, or a transmission interface point.

In a preferred embodiment of the electrical assembly of the invention, the reference fault current resulting from operation of the voltage sourced converter in accordance with pre-fault steady-state voltage phase and magnitude values would not have been subjected to any limitation.

The determined operating parameters of the voltage sourced converter may include voltage phase and magnitude.

In embodiments of the invention, the determination of the operating parameters of the voltage sourced converter using the first and second sets of voltage and current measurements may include determining system parameters of the faulted AC network based on the first and second sets of voltage and current measurements and then determining the operating parameters of the voltage source converter based on the determined system parameters of the faulted AC network. Examples of the determined system parameters of the faulted AC network may include: a magnitude of a voltage source of the faulted AC network; a phase of a voltage source of the faulted AC network; and/or an impedance of the AC network. In further embodiments of the invention, the determination of the operating parameters of the voltage source converter using the first and second sets of voltage and current measurements may include determining system parameters of the faulted AC network based on the first and second sets of voltage and current measurements and then determining the operating parameters of the voltage source converter.

The electrical assembly may comprise at least one voltage sensor and at least one current sensor for respectively measuring the voltage and current at the interface connection point. The or each voltage sensor and the or each current sensor may be configured to communicate the voltage and current measurements to the controller, for example via telecommunication links and/or via another controller such as a central controller. Each set of voltage and current measurements may be taken at the interface connection point at any time during the fault in the AC network. For example, the first set of voltage and current measurements may be taken at the interface connection point between the voltage sourced converter and the AC network at the instant of the fault occurring.

In still further embodiments of the invention, the electrical assembly may include a fault detection device for detecting a fault in the AC network. The fault detection device may, for example, include at least one voltage sensor for sensing a voltage property of the AC network and/or at least one current sensor for sensing a current property of the AC network. The fault detection device may be configured to communicate a fault detection event to the controller, for example via telecommunication links and/or via another controller such as a central controller.

According to a second aspect of the invention, there is provided a method of operating an electrical assembly comprising a voltage sourced converter for connection to an AC network, the method comprising the steps of, responsive to detection of a fault in the AC network:

obtaining a first set of voltage and current measurements taken at an interface connection point between the voltage sourced converter and the AC network;

after obtaining the first set of voltage and current measurements, changing operation of the voltage sourced converter to inject a modified fault current, and then obtain a second set of voltage and current measurements taken at the interface connection point;

using the first and second sets of voltage and current measurements, determining operating parameters of the voltage sourced converter for injecting a target fault current having a target phase angle that is the same, or substantially the same, as a phase angle of a reference fault current that would have resulted from operation of the voltage sourced converter in accordance with pre-fault steady-state voltage phase and magnitude values; and operating the voltage sourced converter in accordance with the determined operating parameters so as to inject the target fault current at the target phase angle.

The features and advantages of the first aspect of the invention and its embodiments apply mutatis mutandis to the features and advantages of the second aspect of the invention and its embodiments.

In a preferred embodiment of the method of the invention, the reference fault current resulting from operation of the voltage sourced converter in accordance with pre-fault steady-state voltage phase and magnitude values would not have been subjected to any limitation.

In the method of the invention, the determined operating parameters of the voltage sourced converter may include voltage phase and magnitude.

In the method of the invention, the determination of the operating parameters of the voltage sourced converter using the first and second sets of voltage and current measurements may include determining system parameters of the faulted AC network based on the first and second sets of voltage and current measurements and then determining the operating parameters of the voltage source converter based on the determined system parameters of the faulted AC network.

In the method of the invention, the determined system parameters of the faulted AC network may include: a magnitude of a voltage source of the faulted AC network; a phase of a voltage source of the faulted AC network; and/or an impedance of the AC network.

In the method of the invention, the determination of the operating parameters of the voltage source converter using the first and second sets of voltage and current measurements may include determining system parameters of the faulted AC network based on the first and second sets of voltage and current measurements and then determining the operating parameters of the voltage source converter based on the determined system parameters of the faulted AC network and a fundamental frequency reactance of the voltage sourced converter.

In the method of the invention, the first set of voltage and current measurements may be taken at the interface connection point between the voltage sourced converter and the AC network at the instant of the fault occurring.

The method of the invention may include the step of detecting a fault in the AC network.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

DETAILED DESCRIPTION

The following embodiments of the invention are used primarily in HVDC power transmission, but it will be appreciated that the following embodiments of the invention are applicable mutatis mutandis to power transmission at other voltage levels.

Figure 1:
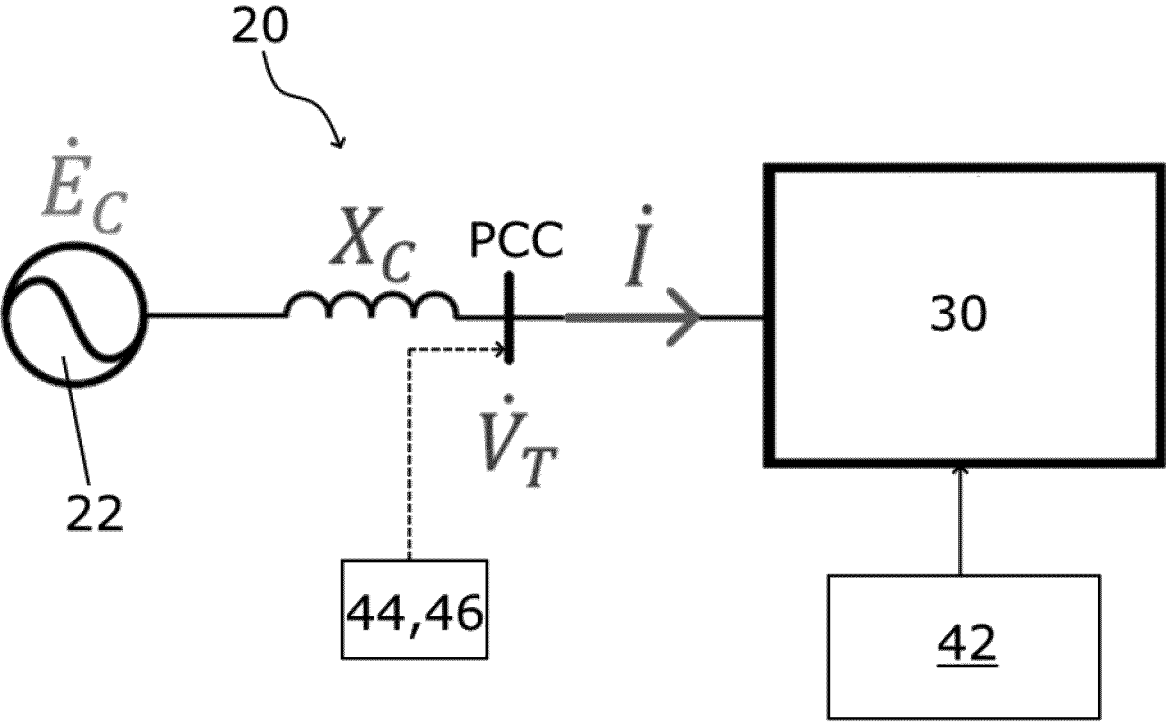
FIG. 1 shows an electrical assembly according to an embodiment of the invention.

An electrical assembly according to an embodiment of the invention is shown in FIG. 1 and is designated generally by the reference numeral 30.

The electrical assembly 20 comprises a voltage sourced converter 22 that is an AC/DC power converter having AC and DC sides. The voltage sourced converter 22 includes first and second DC terminals 24, 26 that define the DC side. The voltage sourced converter 22 includes a plurality of AC terminals 28 that defines the AC side. In use, the AC side of the voltage sourced converter 22 is connected to an AC network 30.

Figure 2:
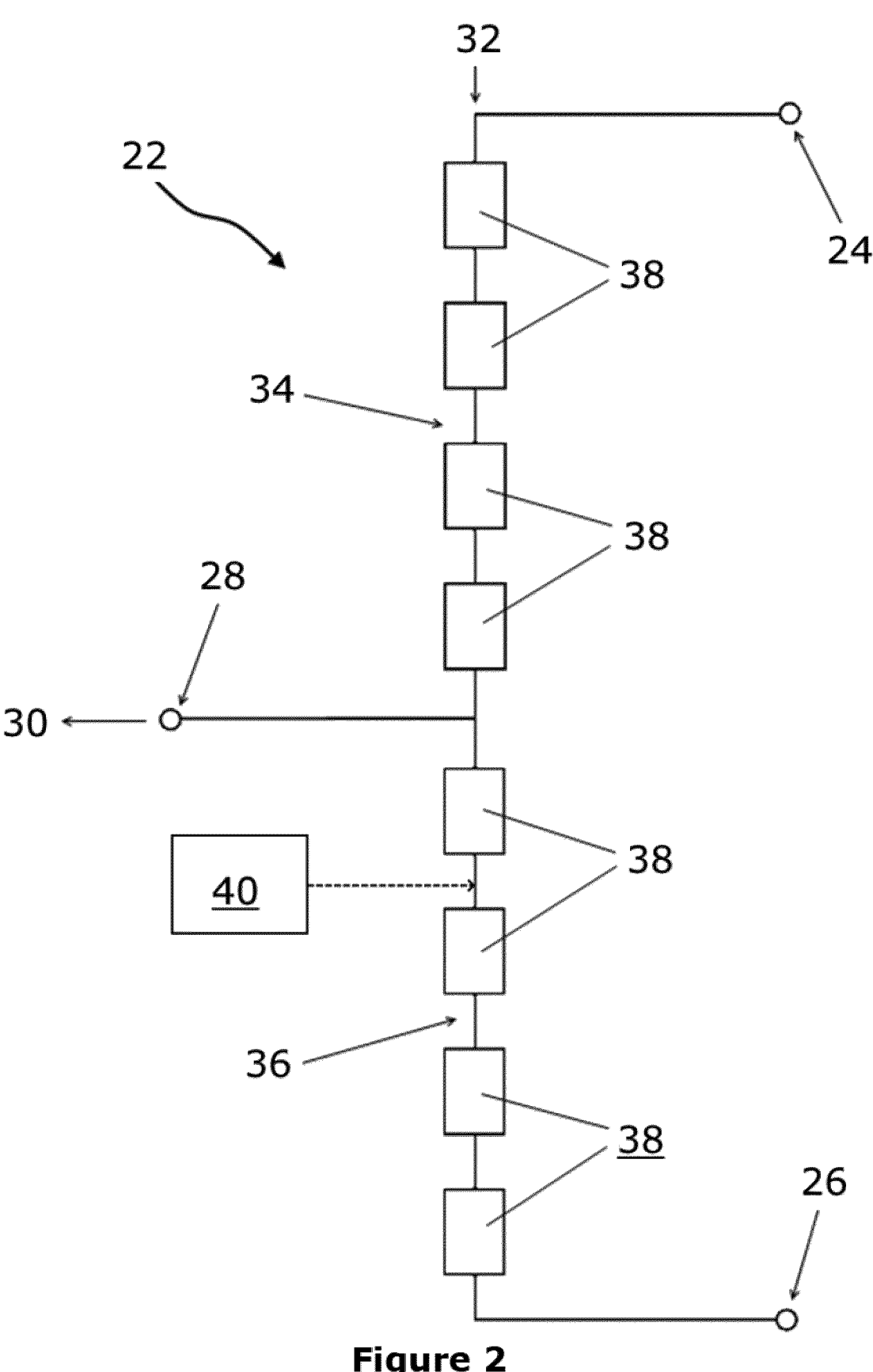
FIG. 2 shows a converter limb of a voltage sourced converter of the electrical assembly of FIG. 1.

The voltage sourced converter 22 includes a plurality of converter limbs 32, each of which is arranged as shown in FIG. 2. Each converter limb 32 extends between the first and second DC terminals 24, 26. Each converter limb 32 includes a first limb portion 34 that extends between the first DC terminal 24 and the AC terminal 28, and a second limb portion 36 that extends between the second DC terminal 26 and the AC terminal 28. Each limb portion 34, 36 includes a plurality of series-connected switching elements 38, each of which is in the form of a thyristor. It is envisaged that, in other embodiments of the invention, the plurality of series-connected switching elements 38 in each limb portion may be replaced by one or more other types of semiconductor switches, such as IGBTs.

It will be appreciated that the topology of the voltage sourced converter 22 is merely chosen to help illustrate the operation of the invention and that the voltage sourced converter 22 may be replaced by another converter with a different topology. For example, the voltage sourced converter may be configured as a chain-link converter, such as the Modular Multilevel Converter (MMC) or the Alternate Arm Converter (AAC). Also, for example, the voltage sourced converter may be an AC/AC or DC/AC voltage sourced converter.

The electrical assembly 20 includes a controller 40 that is programmed to control operation of the voltage sourced converter 22.

The electrical assembly 20 also includes a fault detection device 42 for detecting a fault in the AC network 30. The fault detection device 42 may, for example, include at least one voltage sensor for sensing a voltage property of the AC network 30 and/or at least one current sensor for sensing a current property of the AC network 30. In use, upon detection of the fault in the AC network 30, the fault detection device 42 communicates a fault detection event to the controller 40, which may be carried out via telecommunication links and/or via another controller such as a central controller.

The electrical assembly 20 further includes a voltage sensor 44 and a current sensor 46 for respectively measuring a voltage and a current at a point of common coupling (PCC) located between the voltage sourced converter 22 and the AC network 30. In use, the voltage sensor 44 and the current sensor 46 may be configured to communicate the voltage and current measurements to the controller 40, for example via telecommunication links and/or via another controller such as a central controller.

Figure 3:
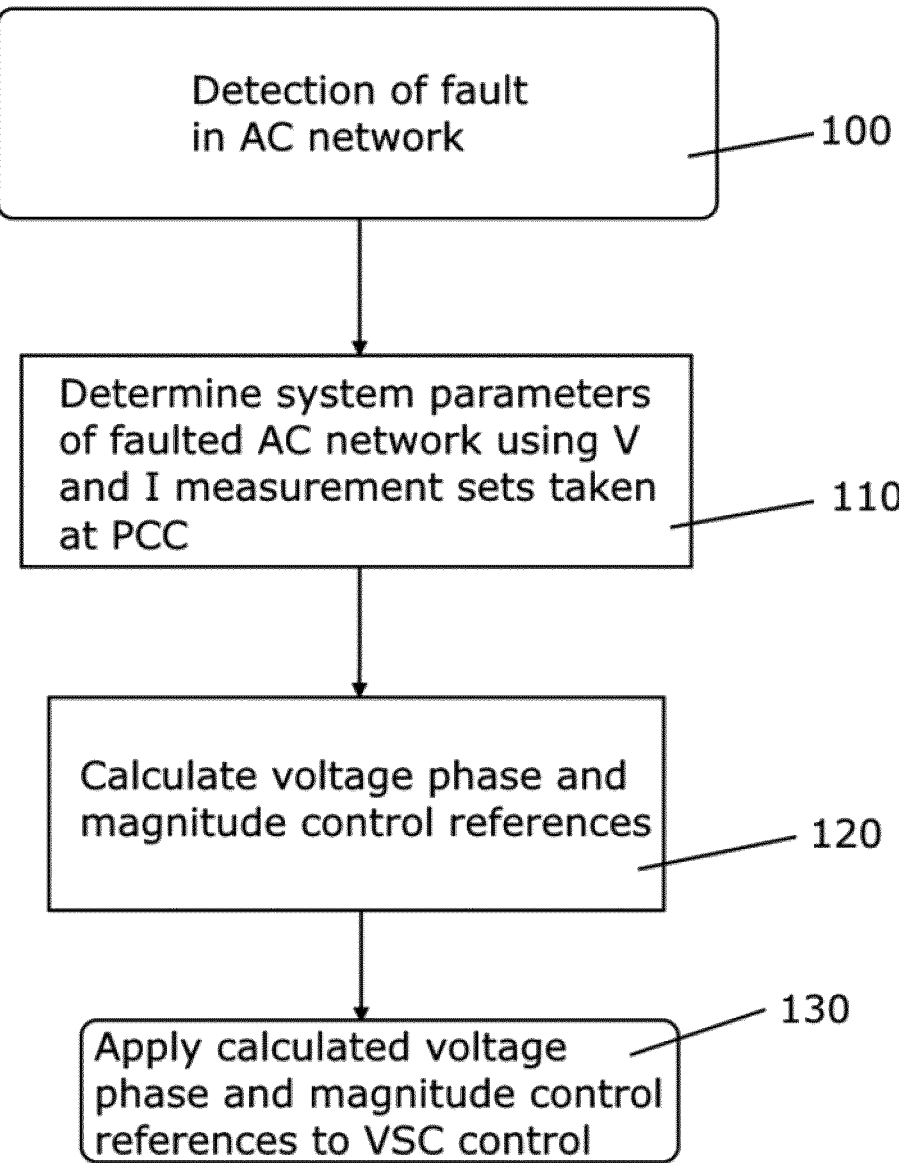
FIG. 3 illustrates an exemplary step-by-step implementation of a fault current phase control capability of the electrical assembly of FIG. 1.

FIG. 3 shows a step-by-step implementation of a fault current phase control capability of the electrical assembly 20.

In the event of an occurrence of a balanced fault in the AC network 30, a fault current begins to flow in the faulted AC network 30. The fault is detected by the fault detection device 42 (Step 100), which then communicates the fault detection event to the controller 40. Responsive to the detection of the fault, the controller 40 carries out a determination of system parameters of the faulted AC network 30 using multiple sets of voltage and current measurements taken at the PCC during the fault, as follows (Step 110).

Figure 4:
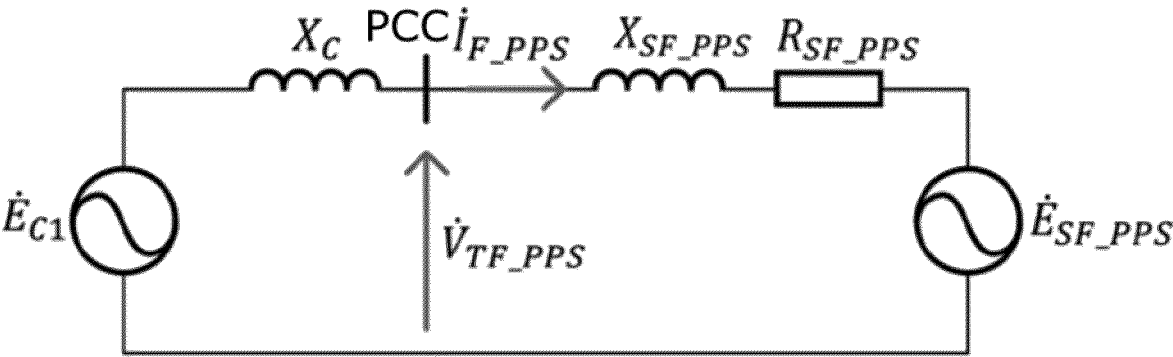
FIG. 4 shows a positive phase sequence (PPS) electrical network representation of the electrical assembly of FIG. 1 and the AC network during a fault in the AC network.

FIG. 4 shows a positive phase sequence electrical network representation of the electrical assembly 20 and the faulted AC network 30.

Known variables of the electrical assembly 20 and the faulted AC network 30 are:

$\dot{E}_{C0}=E_{C0}\angle\theta_{C0}$, pre-fault steady-state PPS magnitude and phase of the voltage sourced converter 22;

$X_C$, fundamental frequency reactance of the voltage sourced converter 22;

$I_{limit}$, rated current limit of the voltage sourced converter 22;

$\dot{I}_{F0}$, 3-phase line-side current measured at the PCC at the instant of the fault occurring;

$\dot{V}_{TF0}$, 3-phase converter voltage measured at the PCC at the instant of the fault occurring.

Unknown variables of the electrical assembly 20 and the faulted AC network 30 are:

$E_{C1}$, PPS magnitude of the voltage sourced converter 22 during the fault;

$\theta_{C1}$, PPS phase of the voltage sourced converter 22 during the fault;

$E_{SF\_PPS}$, PPS magnitude of a voltage source of the faulted AC network 30;

$\theta_{SF\_PPS}$, PPS phase of the voltage source of the faulted AC network 30;

$R_{SF\_PPS}$, PPS resistive part of an impedance of the AC network 30;

$X_{SF\_PPS}$, PPS inductive part of the impedance of the AC network 30.

Where $\dot{E}_{C1}=E_{C1}\angle\theta_{C1}$ and $\dot{E}_{SF\_PPS}=E_{SF\_PPS}\angle\theta_{SF\_PPS}$.

At the instant of the fault, $\dot{I}_{F0\_PPS}$ and $\dot{V}_{TF0\_PPS}$ are the current and voltage measurements of a first set of current and voltage measurements taken at the PCC, thus providing the complex equation $\dot{I}_{F0\_PPS}\cdot(R_{SF\_PPS}+jX_{SF\_PPS})+\dot{E}_{SF\_PPS}-\dot{V}_{TF0\_PPS}=0$. The complex equation represents the voltage sourced converter 22 going into a current limiting mode and acting as a current source at the instant the fault occurs. The real and imaginary parts of the complex equation are split to respectively form the following two equations (1) and (2):

$$\text{Re}\big(\dot{I}_{F0\_PPS}\cdot(R_{SF\_PPS}+jX_{SF\_PPS})+\dot{E}_{SF\_PPS}-\dot{V}_{TF0\_PPS}\big) \qquad \text{Eq. (1)}$$
$$= f_1(E_{SF\_PPS},\ \theta_{SF\_PPS},\ X_{SF\_PPS},\ R_{SF\_PPS})$$
$$= 0$$

$$\text{Img}\big(\dot{I}_{F0\_PPS}\cdot(R_{SF\_PPS}+jX_{SF\_PPS})+\dot{E}_{SF\_PPS}-\dot{V}_{TF0\_PPS}\big) \qquad \text{Eq. (2)}$$
$$= f_2(E_{SF\_PPS},\ \theta_{SF\_PPS},\ X_{SF\_PPS},\ R_{SF\_PPS})$$
$$= 0$$

At another point in time after the instant of the fault occurring and after the first set of current and voltage measurements are obtained, operating conditions of the voltage sourced converter 22 are changed to inject a modified fault current. $\dot{I}_{F1\_PPS}$ and $\dot{V}_{TF1\_PPS}$ are the current and voltage measurements of a second set of current and voltage measurements taken at the PCC, thus providing the complex equation $\dot{I}_{F1\_PPS}\cdot(R_{SF\_PPS}+jX_{SF\_PPS})+\dot{E}_{SF\_PPS}-\dot{V}_{TF1\_PPS}=0$. The real and imaginary parts of this complex equation are split to respectively form the following two equations (3) and (4):

$$\text{Re}\big(\dot{I}_{F1\_PPS}\cdot(R_{SF\_PPS}+jX_{SF\_PPS})+\dot{E}_{SF\_PPS}-\dot{V}_{TF1\_PPS}\big) \qquad \text{Eq. (3)}$$
$$= f_3(E_{SF\_PPS},\ \theta_{SF\_PPS},\ X_{SF\_PPS},\ R_{SF\_PPS})$$
$$= 0$$

$$\text{Img}\big(\dot{I}_{F1\_PPS}\cdot(R_{SF\_PPS}+jX_{SF\_PPS})+\dot{E}_{SF\_PPS}-\dot{V}_{TF1\_PPS}\big) \qquad \text{Eq. (4)}$$
$$= f_4(E_{SF\_PPS},\ \theta_{SF\_PPS},\ X_{SF\_PPS},\ R_{SF\_PPS})$$
$$= 0$$

The controller 40 then solves Equations (1)-(4) analytically to determine the system parameters $E_{SF\_PPS}$, $\theta_{SF\_PPS}$, $X_{SF\_PPS}$, $R_{SF\_PPS}$ of the faulted AC network.

This is followed by the controller 40 carrying out a determination of voltage phase and magnitude control references based on the determined system parameters $E_{SF\_PPS}$, $\theta_{SF\_PPS}$, $X_{SF\_PPS}$, $R_{SF\_PPS}$ of the faulted AC network 30 and the fundamental frequency reactance $X_C$ of the voltage sourced converter 22 to meet two criteria (Step 120).

The phase and magnitude of $\dot{I}_{F\_PPS}$ can be expressed as:

$$\angle \dot{I}_{F\_PPS} = f_5(E_C, \theta_C) \qquad \text{Eq. (5)}$$

$$|\dot{I}_{F\_PPS}| = f_6(E_C, \theta_C) \qquad \text{Eq. (6)}$$

Where $$\dot{I}_{F\_PPS} = \frac{\dot{E}_C - \dot{E}_{SF\_PPS}}{R_{SF\_PPS} + j(X_C + X_{SF\_PPS})}$$

with $E_{SF\_PPS}$, $\theta_{SF\_PPS}$, $X_{SF\_PPS}$, $R_{SF\_PPS}$ having been previously determined by solving Equations (1)-(4).

The first criterion is that operation of the voltage sourced converter 22 in accordance with the determined voltage phase and magnitude control references resulting in injection of a target fault current that is in phase with a reference fault current that would have resulted from operation of the voltage sourced converter 22 in accordance with pre-fault steady-state voltage phase and magnitude. Preferably the reference fault current resulting from operation of the voltage sourced converter in accordance with pre-fault steady-state voltage phase and magnitude values would not have been subjected to any limitation. The phase angle of the PPS fault current produced by operating the voltage sourced converter 22 in accordance with $\dot{E}_{C1}=E_{C1}\angle\theta_{C1}$ is set to be the same as the phase angle of the PPS fault current produced by operating the voltage sourced converter in accordance with $\dot{E}_{C0}=E_{C0}\angle\theta_{C0}$. This results in Equation (7):

$$f_5(E_{C1}, \theta_{C1}) = f_5(E_{C0}, \theta_{C0}) \qquad \text{Eq. (7)}$$

The second criterion is that the injected fault current is equal to or lower than a rated current limit of the voltage sourced converter. The PPS fault current produced by operating the voltage sourced converter 22 in accordance with $\dot{E}_{C1}=E_{C1}\angle\theta_{C1}$ is set to be equal to $I_{limit}$. This results in Equation (8):

$$f_6(E_{C1}, \theta_{C1}) = I_{limit} \qquad \text{Eq. (8)}$$

It will be appreciated that the PPS fault current produced by operating the voltage sourced converter 22 in accordance with $\dot{E}_{C1}=E_{C1}\angle\theta_{C1}$ may instead be set to be a value below $I_{limit}$.

By solving Equations (7) and (8), the values of $E_{C1}$ and $\theta_{C1}$ are determined and respectively applied as voltage magnitude and phase control references for controlling the voltage sourced converter 22 during the fault (Step 130) in order to inject the target fault current, which may be applied in direct-quadrature-zero (dq0) or ABC terms.

As an example, assuming a pre-fault converter voltage $E_{C0}=0.577\angle0°$ per unit for one of the phases, the first and second sets of current and voltage measurements taken at the PCC are shown in Table 2, and the resultant voltage phase and magnitude control references are calculated as shown in Table 2.

TABLE 1

| Fault resistance (Ω) | 1$^{st}$ set of current and voltage measurements (per unit) | 2$^{nd}$ set of current and voltage measurements (per unit) |
|---|---|---|
| 0 | I = 1.5∠−0.90° V = 0.008∠−3.02° | I = 1.5∠−90.90° V = 0.008∠−86.76° |
| 10 | I = 1.5∠−0.87° V = 0.1258∠−27.12° | I = 1.5∠−90.86° V = 0.1730∠−83.95° |
| 20 | I = 1.5∠−0.84° V = 0.240∠−21.63° | I = 1.5∠−90.82° V = 0.331∠−77.42° |

TABLE 2

| Fault resistance (Ω) | Fault current produced by controlling VSC using $\dot{E}_{C0}$ (per unit) | Calculated values of $E_{C1}$ and $\theta_{C1}$ (per unit) | Fault current produced by controlling VSC using $\dot{E}_{C1}$ (per unit) |
|---|---|---|---|
| 0 | 5.629∠−87.87° | 0.154∠−0.0° | 1.500∠−87.86° |
| 10 | 4.400∠−51.88° | 0.206∠−12.52° | 1.492∠−51.88° |
| 20 | 3.050∠−33.33° | 0.3057∠−12.54° | 1.489∠−33.35° |

By controlling the voltage sourced converter 22 using the voltage magnitude and phase control references during the fault, the resulting fault current is controlled to be no higher than the rated current limit $I_{limit}$ and has a phase angle that is the same, or substantially the same, as a phase angle of the reference fault current that would have resulted from operation of the voltage sourced converter 22 in accordance with pre-fault steady-state voltage phase and magnitude.

Figure 5:
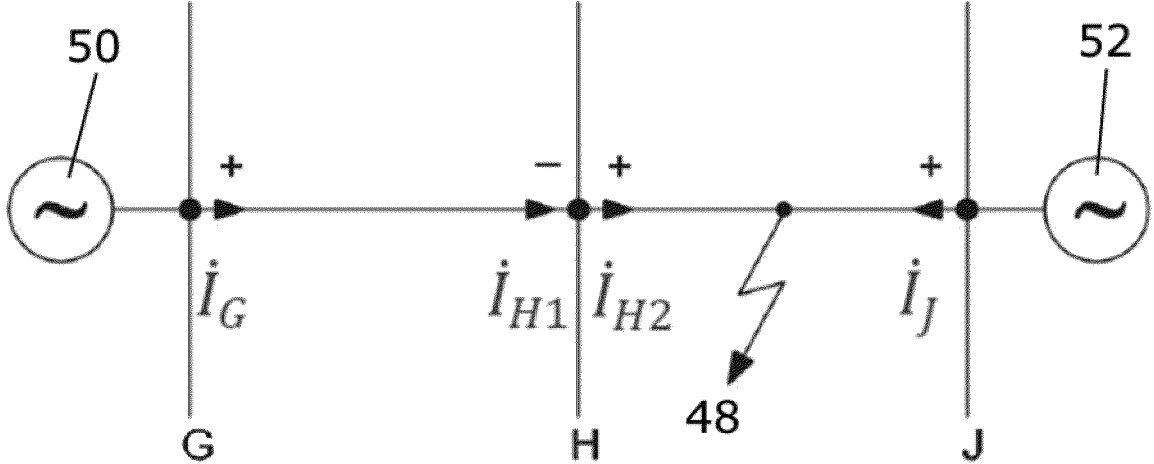
FIG. 5 illustrates a protection scheme to which the invention is applicable.

FIG. 5 shows a protection scheme that can be implemented as a current differential protection scheme or a phase comparison protection scheme.

In a current differential protection scheme, all currents $\dot{I}_{H2},\dot{I}_J$ entering and leaving a protection zone are summed to identify the presence of a fault 48. Proper operation of the current differential protection scheme relies on the currents $\dot{I}_{H2},\dot{I}_J$ from all ends having the right phase angle.

In a phase comparison protection scheme, a location of a fault 48 is determined as internal if a phase difference between currents $\dot{I}_{H2},\dot{I}_J$ from all ends is lower than a threshold, e.g. 90° C. Otherwise the fault location is determined as external if a phase difference between currents $\dot{I}_{H2},\dot{I}_J$ from all ends is higher than the threshold. Proper operation of the phase comparison protection schemes relies on the currents $\dot{I}_{H2},\dot{I}_J$ from all ends having the right phase angle.

In both schemes, faults 48 may stay undetected if a source 50, 52 at one end has a wrong phase angle.

In embodiments of the invention, it is envisaged that the determination of the system parameters of the faulted AC network 30 and the determination of the voltage phase and magnitude control references may be carried out by a processing unit of the controller 40. It is further envisaged that, in other embodiments of the invention, the controller 40 may include a converter control unit that is programmed to control operation of the voltage sourced converter 22, wherein the converter control unit may be configured to receive the voltage phase and magnitude control references from the processing unit.

It will be appreciated that the above equations and numerical values are merely intended to help illustrate the working of the invention and may vary depending on the requirements of the electrical assembly.

It will be further appreciated that the topology of the electrical assembly is merely chosen to help illustrate the working of the invention and may be replaced by other suitable electrical assembly topologies.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An electrical assembly comprising:
   a voltage sourced converter for connection to an AC network;
   a controller programmed so that, responsive to detection of a fault in the AC network, the controller:
   obtains a first set of voltage and current measurements taken at an interface connection point (PCC) between the voltage sourced converter and the AC network;
   after obtaining the first set of voltage and current measurements, change operation of the voltage sourced converter to inject a modified fault current, and then obtain a second set of voltage and current measurements taken at the interface connection point (PCC);
   using the first and second sets of voltage and current measurements, determine operating parameters of the voltage sourced converter for injecting a target fault current having a target phase angle that is the same, or substantially the same, as a phase angle of a reference fault current that would have resulted from operation of the voltage sourced converter in accordance with pre-fault steady-state voltage phase and magnitude values; and
   operate the voltage sourced converter in accordance with the determined operating parameters so as to inject the target fault current at the target phase angle.

2. An electrical assembly according to claim 1, wherein the determined operating parameters of the voltage sourced converter include voltage phase and magnitude.

3. An electrical assembly according to claim 1, wherein the determination of the operating parameters of the voltage sourced converter using the first and second sets of voltage and current measurements includes determining system parameters of the faulted AC network based on the first and second sets of voltage and current measurements and then determining the operating parameters of the voltage source converter based on the determined system parameters of the faulted AC network.

4. An electrical assembly according to claim 3, wherein the determined system parameters of the faulted AC network includes: a magnitude of a voltage source of the faulted AC network; a phase of a voltage source of the faulted AC network; and/or an impedance of the AC network.

5. An electrical assembly according to claim 3, wherein the determination of the operating parameters of the voltage source converter using the first and second sets of voltage and current measurements includes determining system parameters of the faulted AC network based on the first and second sets of voltage and current measurements and then determining the operating parameters of the voltage source converter based on the determined system parameters of the faulted AC network and a fundamental frequency reactance of the voltage sourced converter.

6. An electrical assembly according to claim 1, including a fault detection device for detecting a fault in the AC network, wherein the fault detection device is configured to communicate a fault detection event to the controller.

7. A method of operating an electrical assembly comprising a voltage sourced converter for connection to an AC network, the method comprising the steps of, responsive to detection of a fault in the AC network:
   obtaining a first set of voltage and current measurements taken at an interface connection point between the voltage sourced converter and the AC network;
   after obtaining the first set of voltage and current measurements, changing operation of the voltage sourced converter to inject a modified fault current, and then obtain a second set of voltage and current measurements taken at the interface connection point;
   using the first and second sets of voltage and current measurements, determining operating parameters of the voltage sourced converter for injecting a target fault current having a target phase angle that is the same, or substantially the same, as a phase angle of a reference fault current that would have resulted from operation of the voltage sourced converter in accordance with pre-fault steady-state voltage phase and magnitude values; and
   operating the voltage sourced converter in accordance with the determined operating parameters so as to inject the target fault current at the target phase angle.

8. A method according to claim 7, wherein the determined operating parameters of the voltage sourced converter include voltage phase and magnitude.

9. A method according to claim 7, wherein the determination of the operating parameters of the voltage sourced converter using the first and second sets of voltage and current measurements includes determining system parameters of the faulted AC network based on the first and second sets of voltage and current measurements and then determining the operating parameters of the voltage source converter based on the determined system parameters of the faulted AC network.

10. A method according to claim 9, wherein the determined system parameters of the faulted AC network includes: a magnitude of a voltage source of the faulted AC network; a phase of a voltage source of the faulted AC network; and/or an impedance of the AC network.

11. A method according to claim 9, wherein the determination of the operating parameters of the voltage source converter using the first and second sets of voltage and current measurements includes determining system parameters of the faulted AC network based on the first and second sets of voltage and current measurements and then determining the operating parameters of the voltage source converter based on the determined system parameters of the faulted AC network and a fundamental frequency reactance of the voltage sourced converter.

12. A method according to claim 7, including the step of detecting a fault in the AC network.

* * * * *